(12) United States Patent

Huang

(10) Patent No.: US 12,650,550 B2

(45) Date of Patent: Jun. 9, 2026

(54) ILLUMINATED KEYSWITCH

(71) Applicant: DARFON ELECTRONICS CORP., Taoyuan City (TW)

(72) Inventor: Jui-Yi Huang, Taoyuan City (TW)

(73) Assignee: DARFON ELECTRONICS CORP., Taoyuan City (TW)

( * ) Notice: Subject to any disclaimer, the term of this patent is extended or adjusted under 35 U.S.C. 154(b) by 0 days.

(21) Appl. No.: 18/956,869

(22) Filed: Nov. 22, 2024

(65) Prior Publication Data

US 2025/0172738 A1 May 29, 2025

Related U.S. Application Data

(60) Provisional application No. 63/603,583, filed on Nov. 28, 2023.

(30) Foreign Application Priority Data

Apr. 17, 2024 (TW) .................................. 113114324

(51) Int. Cl.
| | |
|---|---|
| *F21V 8/00* | (2006.01) |
| *G06F 1/16* | (2006.01) |
| *H01H 13/70* | (2006.01) |

(52) U.S. Cl.
CPC ......... *G02B 6/0055* (2013.01); *G06F 1/1662* (2013.01); *H01H 13/70* (2013.01); *H01H 2203/052* (2013.01)

(58) Field of Classification Search
CPC . G06F 1/1662; H01H 13/70; H01H 2203/052
USPC ................................ 362/23.03, 23.04, 23.05
See application file for complete search history.

(56) References Cited

U.S. PATENT DOCUMENTS

| | | | | |
|---|---|---|---|---|
| 2018/0082800 | A1* | 3/2018 | Wang ...................... | H01H 13/10 |
| 2024/0312736 | A1* | 9/2024 | Srivastav .............. | G06F 3/0202 |

* cited by examiner

*Primary Examiner* — Keith G. Delahoussaye

(74) *Attorney, Agent, or Firm* — MUNCY, GEISSLER, OLDS & LOWE, P.C.

(57) ABSTRACT

An illuminated keyswitch includes a base plate, a keycap, a light source disposed on the base plate, and a light-guiding device. The keycap is connected above the base plate with upward and downward movement. The light-guiding device includes an actuating portion and a light-entry portion connecting the actuating portion. The light-entry portion has a first reflective surface, and is positioned above the base plate such that the first reflective surface is located above the light source. The actuating portion has a second reflective surface far away from the first reflective surface, and is positioned between a bottom surface of the keycap and a switch contact. A light emitted by the light source is directed upward into the light-guiding device, reflected by the first reflective surface and guided by the light-guiding device out of a front face of the actuating portion to uniformly illuminate a translucent region of the keycap.

9 Claims, 5 Drawing Sheets

ILLUMINATED KEYSWITCH

CROSS-REFERENCE TO RELATED APPLICATION

This utility application claims priorities to U.S. Provisional Application Ser. No. 63/603,583, filed Nov. 28, 2023, and Taiwan Application Serial Number 113114324, filed Apr. 17, 2024, the disclosures of which are incorporated herein by reference in their entireties.

BACKGROUND OF THE INVENTION

1. Field of the Invention

The invention relates to an illuminated keyswitch, an in particular, to an illuminated keyswitch in which a light emitted by a light source can uniformly illuminate a transparent region of a keycap.

2. Description of the Prior Art

An illuminated keyswitch of a prior art has used a light source to emit a light to directly illuminate a transparent region of keycap. Further, in order to realize upward and downward movement of the keycap, triggering of a switch, etc., the illuminated keyswitch of the prior art has been equipped with a dome-shaped resilient actuator and a lifting apparatus (e.g., scissor-type lifting apparatus).

However, because the above-mentioned illuminated keyswitch of the prior art is limited by the dome-shaped resilient actuator, the lifting apparatus, and other members and devices, the light source can only be positioned under one side of the keycap, which results in the light emitted by the light source not being able to uniformly illuminate the transparent region of the keycap. In other words, the above mentioned illuminated keyswitch of the prior art has an obvious drawback that when the light source emits the light, the keycap appears darker on one side and brighter on the other side.

SUMMARY OF THE INVENTION

Accordingly, one scope of the invention is to provide an illuminated keyswitch in which a light emitted by a light source can uniformly illuminate a transparent region of a keycap.

An illuminated keyswitch according to a preferred embodiment of the invention includes a base plate, a keycap, a light source, and a light-guiding device. The keycap has a translucent region. The keycap is connected above the base plate with upward and downward movement such that the keycap moves between an unpressed position and a pressed position with respect to the base plate. The light source is disposed on the base plate. The light-guiding device includes an actuating portion and a light-entry portion connecting the actuating portion. The light-entry portion has a first reflective surface. The actuating portion has a second reflective surface far away from the first reflective surface. The light-entry portion is positioned above the base plate such that the first reflective surface is located above the light source. A light emitted by the light source is directed upward into the light-guiding device, reflected by the first reflective surface of the light-entry portion and guided by the light-guiding device out of a front face of the actuating portion to uniformly illuminate the translucent region of the keycap. The light directed to the second reflective surface of the actuating portion is reflected by the second reflective surface, and then emitted from the front face of the actuating portion.

Further, the illuminated keyswitch according to the preferred embodiment of the invention also includes a membrane circuit board, a switch contact and a resilient dome. The membrane circuit board is disposed on the base plate. The light source is electrically bonded on the membrane circuit board. The switch contact is formed on the membrane circuit board. The resilient dome is mounted on the membrane circuit board such that the switch contact is located directly below the resilient dome. An inner surface of the resilient dome is conductive at least. The actuating portion urges against a bottom surface of the keycap and a top of the resilient dome. When the keycap is pressed to move to the pressed position, the actuating portion deforms the resilient dome such that the inner surface of the resilient dome contacts the switch contact to conduct the switch contact. When the keycap is released to move to the unpressed position, the resilient dome restores to an original shape thereof such that the inner surface of the resilient dome is separated from the switch contact.

In one embodiment, the light-entry portion also has a depression opposite to the first reflective surface. The light-entry portion is positioned above the membrane circuit board such that the depression of the light-entry portion is located above the light source. The light emitted by the light source is directed upward into the light-guiding device from the depression of the light-entry portion.

In one embodiment, a first included angle between a first normal direction of the first reflective surface of the light-entry portion and a second normal direction of the membrane circuit board ranges from 120 degrees to 150 degrees.

In one embodiment, a second included angle between a third normal direction of the second reflective surface of the actuating portion and the second normal direction of the membrane circuit board ranges from 30 degrees to 60 degrees.

In one embodiment, the light-guiding device further includes an actuating pillar. The actuating pillar is formed on a back face of the actuating portion, and abuts the resilient dome.

In one embodiment, the actuating portion also has a side surface which is adjacent to the front face and the second reflective surface. The light-guiding device further includes N positioning portions where N is a natural number. The N positioning portions extend outwardly from the side surface of the actuating portion. Each of the N positioning portions has a respective and formed-through positioning aperture. The keycap includes N positioning posts. The N positioning posts are formed on the bottom surface of the keycap. Each positioning post corresponds to one of the N positioning apertures, and passes through the corresponding positioning aperture.

In one embodiment, the actuating portion defines a center axial line which passes through the actuating pillar and is parallel to the first reflective surface of the light-entry portion. A modification of the illuminated keyswitch according to the preferred embodiment of the invention further includes a reflective layer. The reflective layer is overlaid on the second reflective surface and the back face of the actuating portion located on a side of the center axial line away from the first reflective surface of the light-entry portion.

In one embodiment, the resilient dome can be formed from a metal sheet.

In another embodiment, the resilient dome can be formed of a polymer material mixed with a plurality of graphite particles or a plurality of metal particles In another embodiment, the resilient dome formed of a polymer material. The resilient dome includes a metal film at least overlaid on the inner surface of the resilient dome.

Different from the illuminated keyswitch of the prior art, the illuminated keyswitch according to the invention uses a novel light-guiding device instead of using the dome-shaped resilient actuator and the lifting apparatus in the illuminated keyswitch of the prior art. Moreover, the overall architecture of the illuminated keyswitch according to the invention allows the light emitted by the light source to uniformly illuminate the transparent region of the keycap.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
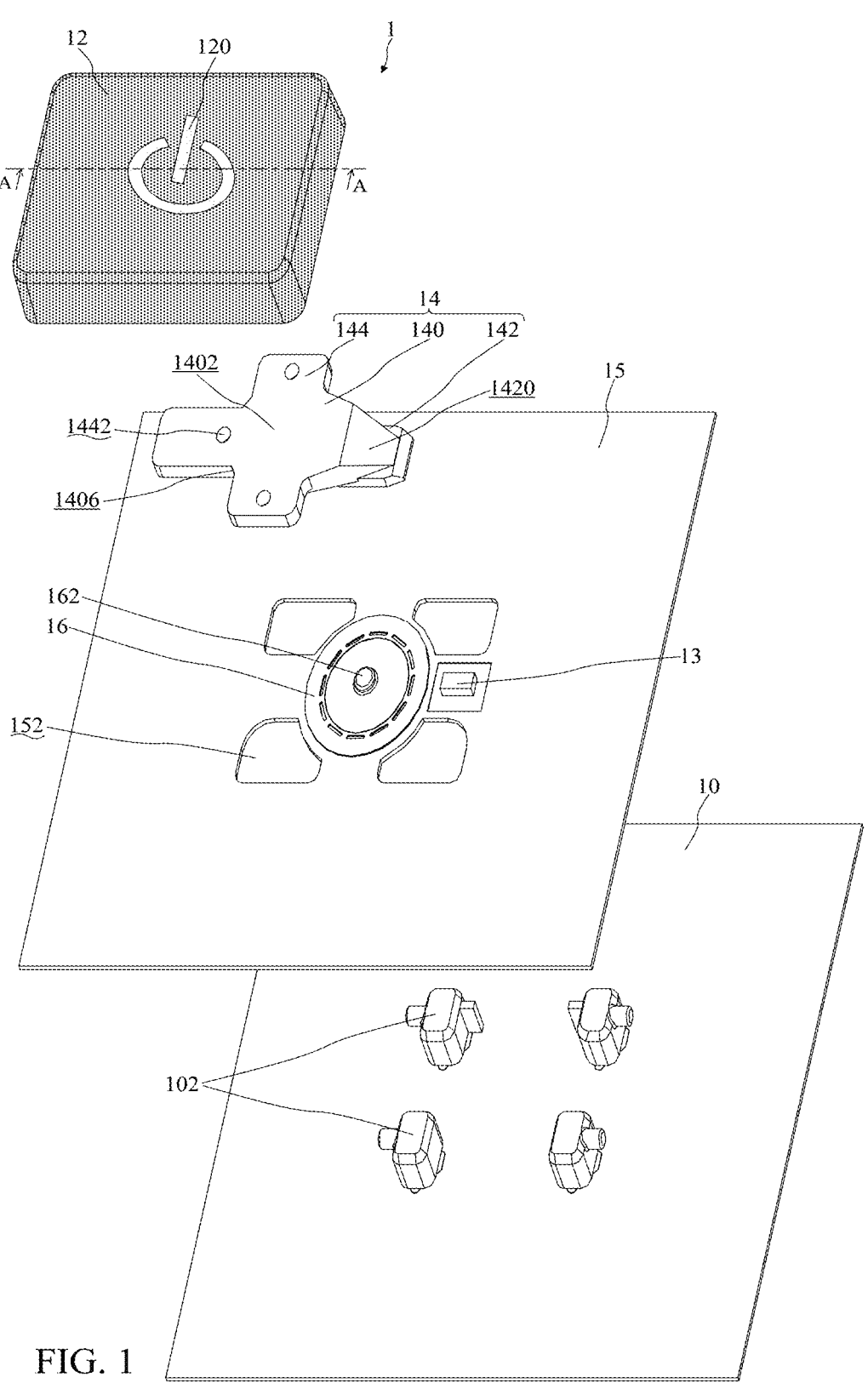
FIG. 1 is an explosive view of the devices and the members of the illuminated keyswitch according to the preferred embodiment of the invention.
Figure 2:
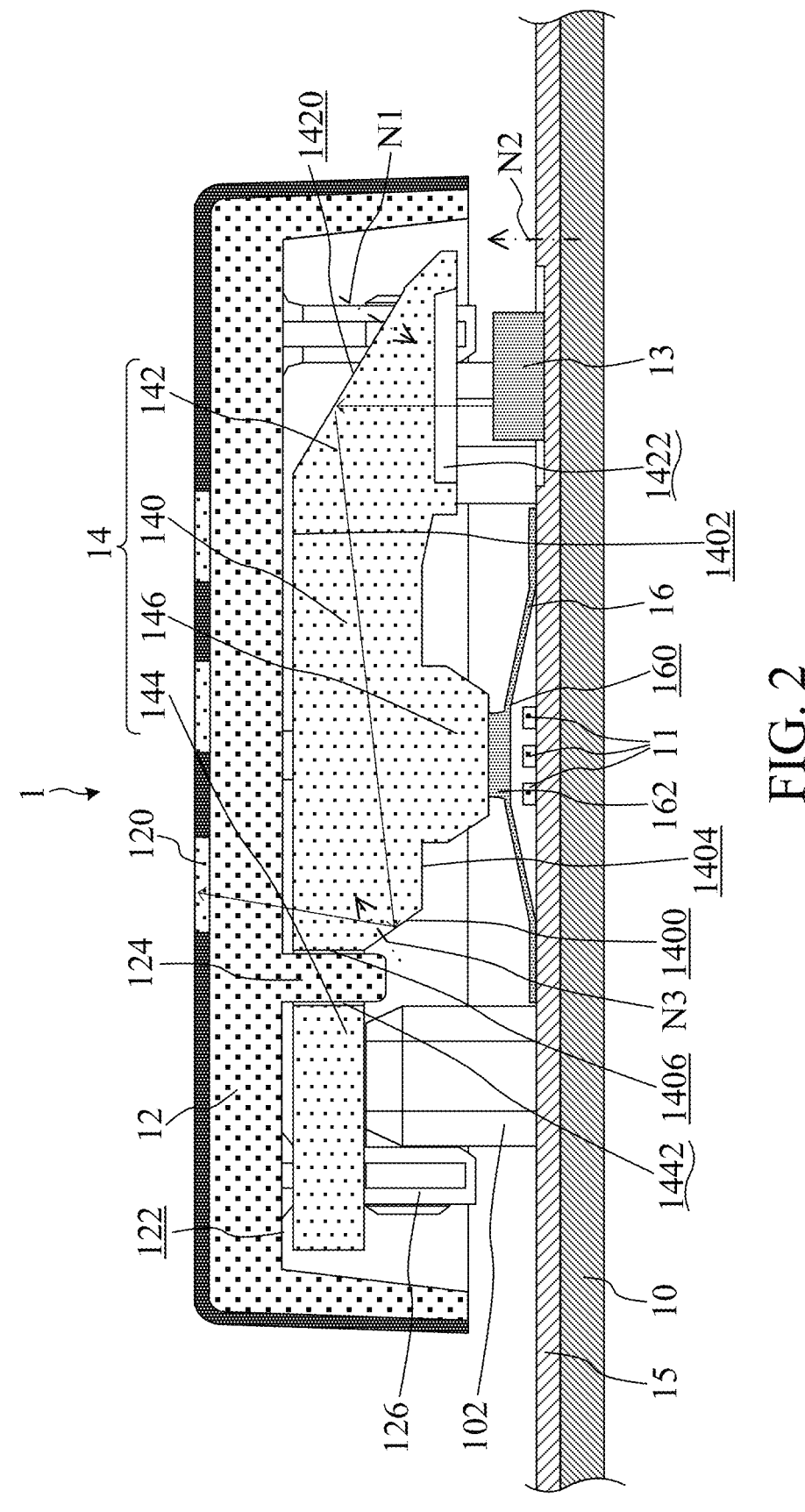
FIG. 2 is a cross-sectional view of the devices and the members of the illuminated keyswitch according to the preferred embodiment of the invention after assembly and along the line A-A in FIG. 1.
Figure 3:
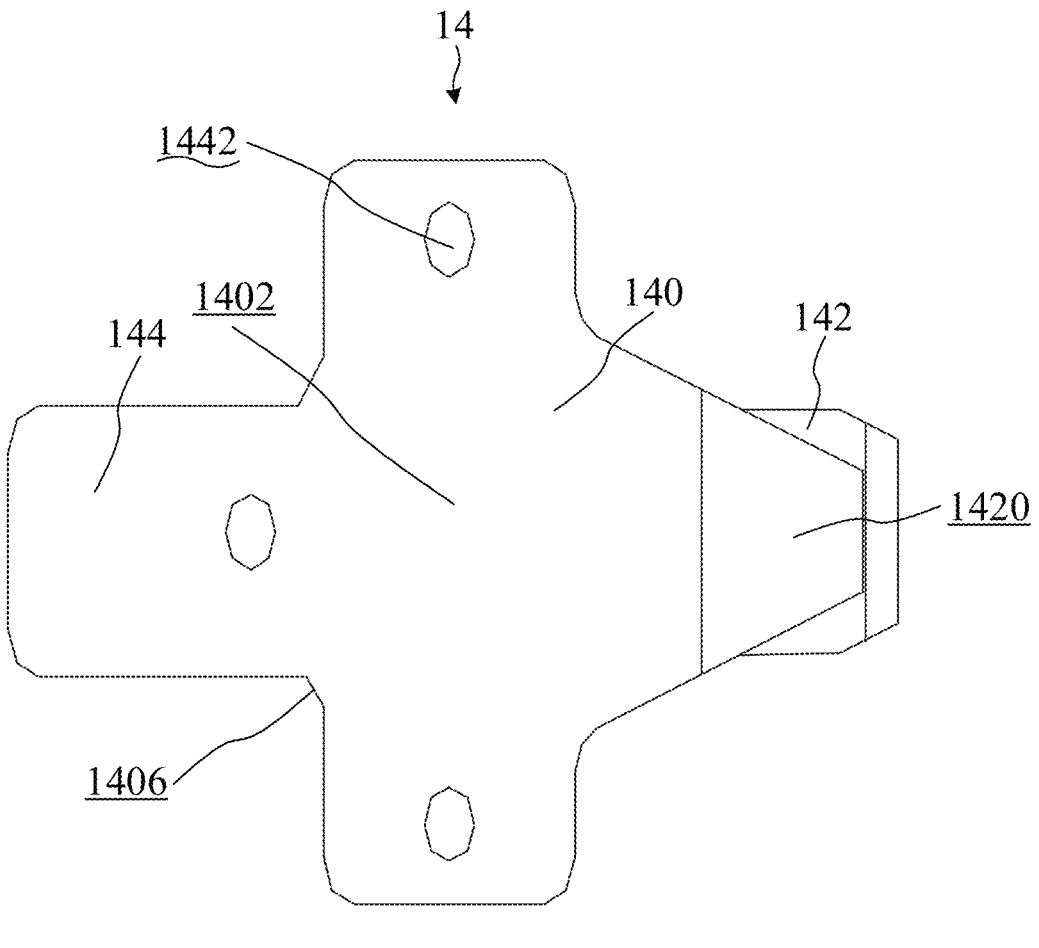
FIG. 3 is a top view of a light-guiding device, which is an essential device of the illuminated keyswitch according to the preferred embodiment of the invention.
Figure 4:
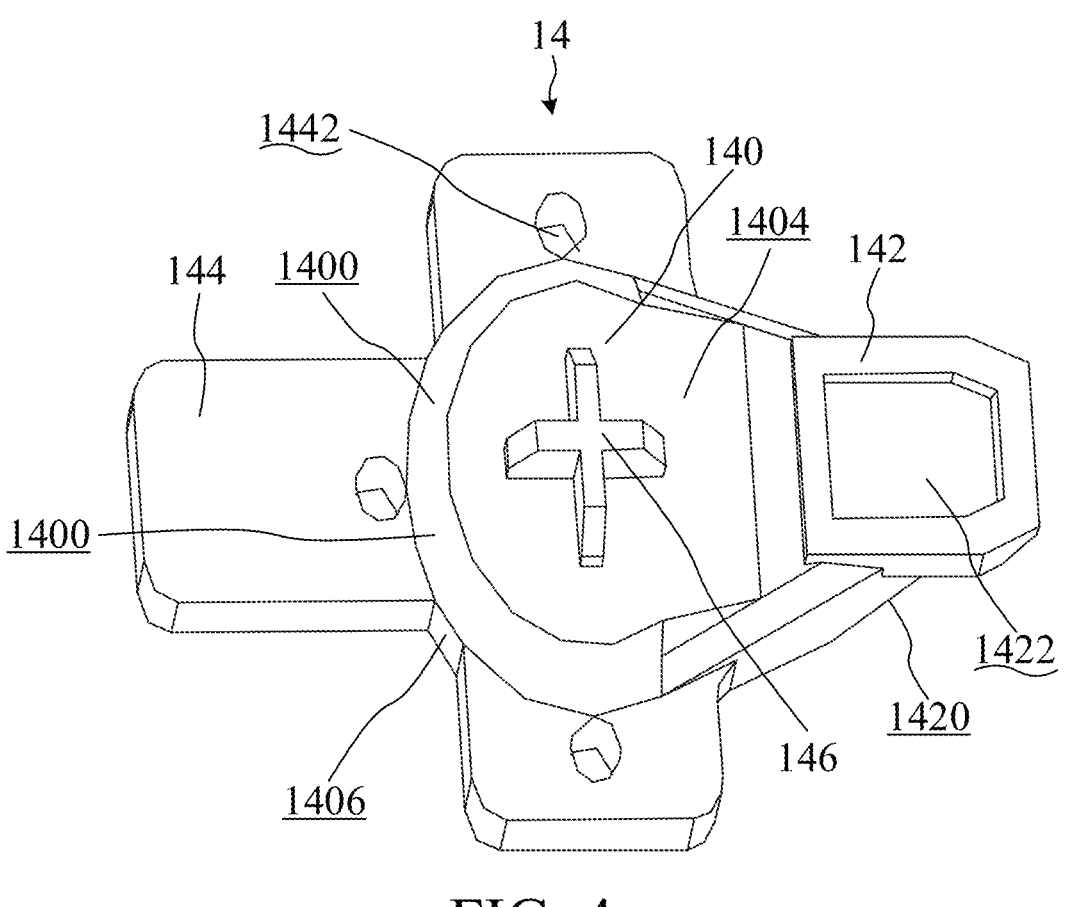
FIG. 4 is a bottom view of the light-guiding device, which is an essential device of the illuminated keyswitch according to the preferred embodiment of the invention.

Referring to FIG. 1, FIG. 2, FIG. 3 and FIG. 4, those drawings schematically illustrate the illuminated keyswitch 1 according to the preferred embodiment of the invention. FIG. 1 schematically illustrates with an explosive view the devices and the members of the illuminated keyswitch 1 according to the preferred embodiment of the invention. FIG. 2 is a cross-sectional view of the devices and the members of the illuminated keyswitch 1 according to the preferred embodiment of the invention after assembly and along the line A-A in FIG. 1. FIG. 3 is a top view of a light-guiding device 14, which is an essential device of the illuminated keyswitch 1 according to the preferred embodiment of the invention. FIG. 4 is a bottom view of the light-guiding device 14, which is an essential device of the illuminated keyswitch 1 according to the preferred embodiment of the invention.

As shown in FIG. 1 and FIG. 2, FIG. 3 and FIG. 4, the illuminated keyswitch 1 according to the preferred embodiment of the invention includes a base plate 10, a keycap 12, a light source 13, and a light-guiding device 14.

The keycap 12 has a translucent region 120. The keycap 12 is connected above the base plate 10 with upward and downward movement such that the keycap 12 moves between an unpressed position and a pressed position with respect to the base plate 10. For example, as shown in FIG.

1 and FIG. 2, two pairs of receiving members are formed on the base plate 10. Two pairs of receiving channels 126 are formed on a bottom surface 122 of the keycap 12. The keycap 12 is engaged with to the receiving members 102 by means of the receiving channels 126 to realize upward and downward movement with respect to the base plate 10. In one embodiment, two pairs of receiving channels 126 are symmetrically disposed on the bottom surface 122 of the keycap 12.

The light source 13 is disposed on the base plate 10. The light-guiding device 14 includes an actuating portion 140 and a light-entry portion 142 connecting the actuating portion 140. The light-entry portion 142 has a first reflective surface 1420. The actuating portion 140 has a second reflective surface 1400 far away from the first reflective surface 1420. The light-entry portion 142 is positioned above the base plate 10 such that the first reflective surface 1420 is located above the light source 13. A light emitted by the light source 13 is directed upward into the light-guiding device 14, and reflected by the first reflective surface 1420 of the light-entry portion 142. At least one portion of the light propagated in the light-guiding device 14 is guided by the light-guiding device 14 out of a front face 1402 of the actuating portion 140 to uniformly illuminate the translucent region 120 of the keycap 12. At the same time, the light directed to the second reflective surface 1400 of the actuating portion 140 is reflected by the second reflective surface 1400, and then emitted from the front face 1402 of the actuating portion 140. Thereby, the light emitted by the light source 13 can be transmitted by the interplay of the first reflective surface 1420 of the light-entering portion 142 and the second reflective surface 1400 of the actuating portion 140 far away from the first reflective surface 1420, and the illuminated keyswitch 1 according to the preferred embodiment of the invention allows the light emitted by the light source 13 to uniformly illuminate the transparent region 120 of the keycap 12.

In one embodiment, the light source 13 can be light-emitting diodes or organic light-emitting diodes, but the invention is not limited thereto.

Further, the illuminated keyswitch 1 according to the preferred embodiment of the invention also includes a membrane circuit board 15, a switch contact 11 and a resilient dome 16. The membrane circuit board 15 is disposed on the base plate 10. The light source 13 is electrically bonded on the membrane circuit board 15. The switch contact 11 is formed on the membrane circuit board 15. The resilient dome 16 is mounted on the membrane circuit board 15 such that the switch contact 11 is located directly below the resilient dome 16. An inner surface 160 of the resilient dome 16 is conductive at least. The actuating portion 140 urges against a bottom surface 122 of the keycap 12 and a top of the resilient dome 16. When the keycap 12 is pressed to move to the pressed position, the actuating portion 140 moves downward and deforms the resilient dome 16 such that the inner surface 160 of the resilient dome 16 contacts the switch contact 11 to conduct the switch contact 11. When the keycap 12 is released to move to the unpressed position, the resilient dome 16 restores to an original shape thereof such that the inner surface 160 of the resilient dome 16 is separated from the switch contact 11. As shown in FIG. 1, the membrane circuit board 15 has four breakout holes 152, and two pairs of receiving members 102 pass through the corresponding breakout holes 152 to facilitate engagement with the receiving channels 126.

In one embodiment, the light-entry portion 142 also has a depression 1422 opposite to the first reflective surface 1420.

The light-entry portion 142 is positioned above the membrane circuit board 15 such that the depression 1422 of the light-entry portion 142 is located above the light source 13. The light emitted by the light source 13 is directed upward into the light-guiding device 14 from the depression 1422 of the light-entry portion 142. The guiding effect of the light-entry portion 142 on the light emitted by the light source 13 can be enhanced by the provision of the depression 1422. Further, when the keycap 12 moves to the pressed position, the depression 1422 can be used as a refuge to avoid the light-entry portion 142 from hitting the light source 13, and also allows the light source 13 to be partially accommodated in the depression 1422, which is conducive to reducing the overall thickness of the illuminated keyswitch 1 according to the preferred embodiment of the invention.

In one embodiment, the light-guiding device 14 can be made of acrylic, silicone, thermoplastic polyurethane (TPU), or other commercially available light-guiding polymer materials.

In one embodiment, a first included angle between a first normal direction N1 of the first reflective surface 1420 of the light-entry portion 142 and a second normal direction N2 of the membrane circuit board 15 ranges from 120 degrees to 150 degrees. As shown in FIG. 2, with respect to the membrane circuit board 15, the first reflective surface 1420 is beveled. The first included angle setting makes the light incident from the light source 13 reflect at the first reflective surface 1420 (or even total reflection), and reduces or even avoids refraction of the light at the first reflective surface 1420, which results in a reduction of the light output efficiency or even the occurrence of light leakage from the edge of the keycap 12. The specific angle of the first included angle depends on the refractive index of the light-guiding device 14.

In one embodiment, a second included angle between a third normal direction N3 of the second reflective surface 1400 of the actuating portion 140 and the second normal direction N2 of the membrane circuit board 15 ranges from 30 degrees to 60 degrees. As shown in FIG. 2 and FIG. 4, with respect to the membrane circuit board 15, the second reflective surface 1400 is beveled. The second included angle setting makes the light incident from the light source 13 reflect at the second reflective surface 1400 (or even total reflection), and reduces or even avoids refraction of the light at the second reflective surface 1400, which results in a reduction of the light output efficiency or even the occurrence of light leakage from the edge of the keycap 12. The specific angle of the second included angle depends on the refractive index of the light-guiding device 14.

In one embodiment, the light-guiding device 14 further includes an actuating pillar 146. The actuating pillar 146 is formed on a back face 1404 of the actuating portion 140 (i.e., the side of the actuator 140 away from the keycap 12), and abuts the resilient dome 16.

In one embodiment, the resilient dome 16 can be formed from a metal sheet.

In another embodiment, the resilient dome 16 can be formed of a polymer material mixed with a plurality of graphite particles or a plurality of metal particles.

In another embodiment, the resilient dome 16 formed of a polymer material. The resilient dome 16 includes a metal film at least overlaid on the inner surface 160 of the resilient dome 16 to enable the inner surface 160 of the resilient dome 16 to be conductive at least.

In one embodiment, the actuating portion 140 also has a side surface 1406 which is adjacent to the front face 1402 and the second reflective surface 1400. The light-guiding device 14 further includes N positioning portions 144 where N is a natural number. The N positioning portions 144 extend outwardly from the side surface 1406 of the actuating portion 140. Each of the N positioning portions 144 has a respective and formed-through positioning aperture 1442. The keycap 12 includes N positioning posts 124. The N positioning posts 124 are formed on the bottom surface 122 of the keycap 12. Each positioning post 124 corresponds to one of the N positioning apertures 1442, and passes through the corresponding positioning aperture 1442.

In the example shown in FIG. 1 to FIG. 4, N equals 3, i.e., the light-guiding device 14 includes three positioning portions 144. On the basis of the intermediate area where the actuating pillar 146 is located, the light-entry portion 142 protrudes from one side thereof, and the three positioning portions 144 protrude from the other three sides thereof so that four notched portions can be formed between adjacent positioning portions 144 and between the positioning portions 144 and the light-entry portion 142. The shape of each notched portion may be different. The aforementioned two pairs of receiving members 102 and the two pairs of receiving channels 126 may be set up accordingly and engaged. In this way, by the setting of the positioning portion s144, the positioning between the light-guiding device 14 and the keycap 12 can be realized, and the notched portions can be formed, so as to facilitate the setting and engagement of the receiving members 102 and the receiving channels 126.

Figure 5:
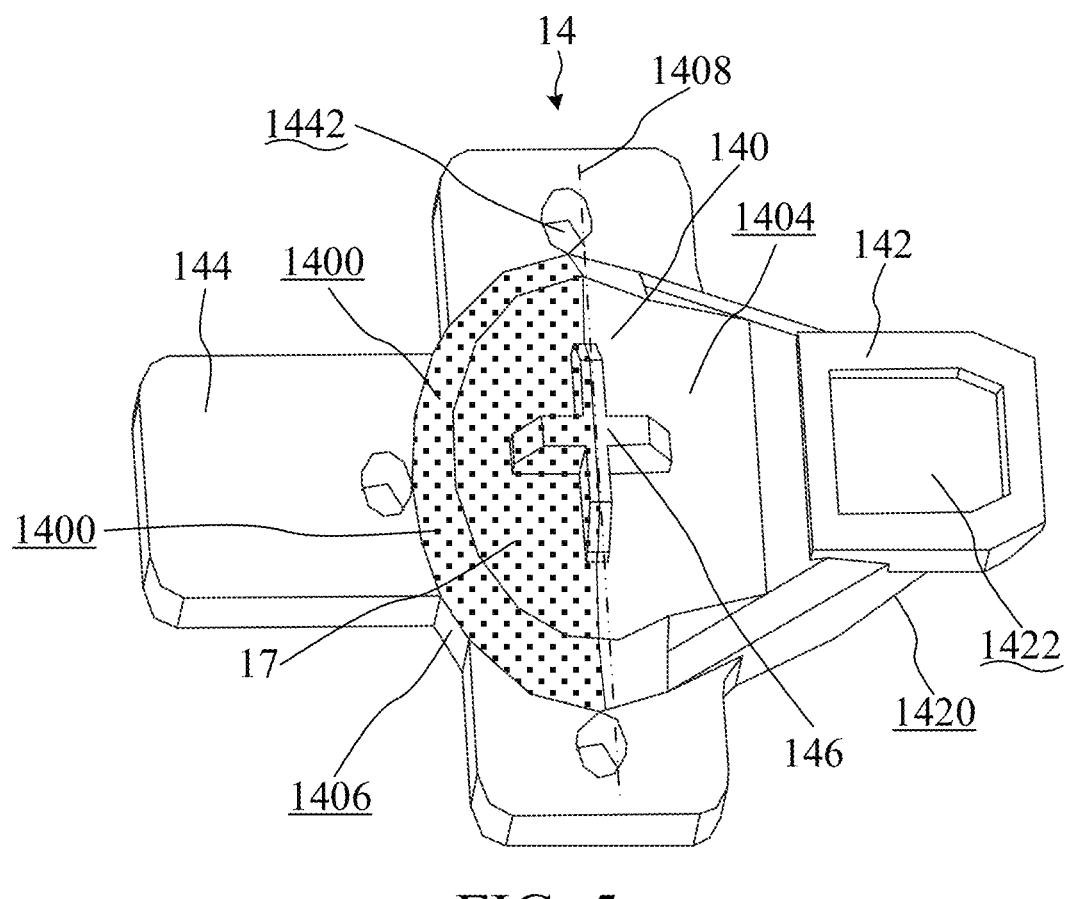
FIG. 5 is a bottom view of a light-guiding device, which is an essential device of a modification of the illuminated keyswitch according to the preferred embodiment of the invention.

Referring to FIG. 5, FIG. 5 is a bottom view of a light-guiding device 14, which is an essential device of a modification of the illuminated keyswitch 1 according to the preferred embodiment of the invention.

As shown in FIG. 5, further, the actuating portion 140 defines a center axial line 1048 which passes through the actuating pillar 146. Bounded by the center axial line 1048, one side of the center axial line 1408 is adjacent to the light source 13, and the other side of the center axial line is away from the light source 13. Moreover, the center axial line 1048 is parallel to the first reflective surface 1420 of the light-entry portion 142. According to the modification of the preferred embodiment of the invention, the illuminated keyswitch 1 further includes a reflective layer 17. The reflective layer 17 is overlaid on the second reflective surface 1400 and the back face 1404 of the actuating portion 140 located on the side of the center axial line 1048 away from the first reflective surface 1420 of the light-entry portion 142.

By reflecting the light by the reflective layer 17, the amount of light directed to the portion of the transparent region 120 away from the light source 13 can be further caused to increase the brightness of the portion of the transparent region 120 away from the light source 13, so that the amount of light directed to the portion of the transparent region 120 away from the light source 13 is more consistent with the amount of light directed to the portion of the transparent region 120 in close proximity to the light source 13. Thereby, the illuminated keyswitch 1 according to the preferred embodiment of the invention allows the light emitted by the light source 13 to uniformly illuminate the transparent region 120 of the keycap 12.

In one embodiment, the reflective layer 17 can be formed of a light-colored ink (e.g., white ink). In another embodiment, the reflective layer 17 can be formed by a coating.

In summary, the illuminated keyswitch of the invention is provided with a light-guiding device, so that the light emitted by the light source in the illuminated keyswitch can more uniformly illuminate the transparent region of the keycap. And further, by providing a reflective layer on the side of the light-guiding device far away from the light source to increase the brightness of the portion of the transparent region far away from the light source, the brightness of the light-transparent region of the keycap can further be made evenly uniform.

With the detailed description of the above preferred embodiments of the invention, it is clear to understand that the illuminated keyswitch according to the invention uses a novel light-guiding device instead of using the dome-shaped resilient actuator and the lifting apparatus in the illuminated keyswitch of the prior art. Moreover, the overall architecture of the illuminated keyswitch according to the invention allows the light emitted by the light source to uniformly illuminate the transparent region of the keycap.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An illuminated keyswitch, comprising:

a base plate;

a keycap, having a translucent region, being connected above the base plate, and configured to have upward and downward movement such that the keycap moves between an unpressed position and a pressed position with respect to the base plate;

a light source, disposed on the base plate;

a light-guiding device, comprising an actuating portion and a light-entry portion connecting the actuating portion, the light-entry portion having a first reflective surface, the actuating portion having a second reflective surface on an opposite side of the actuating portion from the first reflective surface, the light-entry portion being positioned above the base plate such that the first reflective surface is located above the light source, a light emitted by the light source is directed upward into the light-guiding device, reflected by the first reflective surface and guided by the light-guiding device out of a front face of the actuating portion to uniformly illuminate the translucent region, the light directed to the second reflective surface being reflected by the second reflective surface and then emitted from the front face of the actuating portion;

a membrane circuit board, disposed on the base plate, the light source being electrically bonded on the membrane circuit board;

a switch contact, formed on the membrane circuit board; and a resilient dome, mounted on the membrane circuit board such that the switch contact is located directly below the resilient dome, an inner surface of the resilient dome being conductive at least, wherein the actuating portion urges against a bottom surface of the keycap and a top of the resilient dome, wherein when the keycap is pressed to move to the pressed position, the actuating portion deforms the resilient dome such that the inner surface of the resilient dome contacts the switch contact to conduct the switch contact, wherein when the keycap is released to move to the unpressed position, the resilient dome restores to an original shape thereof such that the inner surface of the resilient dome is separated from the switch contact.

2. The illuminated keyswitch of claim 1, wherein the light-entry portion also has a depression opposite to the first reflective surface, the light-entry portion is positioned above the membrane circuit board such that the depression is located above the light source, the light emitted by the light source is directed upward into the light-guiding device from the depression.

3. The illuminated keyswitch of claim 1, wherein a first included angle between a first normal direction of the first reflective surface and a second normal direction of the membrane circuit board ranges from 120 degrees to 150 degrees.

4. The illuminated keyswitch of claim 3, wherein a second included angle between a third normal direction of the second reflective surface and the second normal direction of the membrane circuit board ranges from 30 degrees to 60 degrees.

5. The illuminated keyswitch of claim 1, wherein the light-guiding device further comprises an actuating pillar being formed on a back face of the actuating portion and abutting the resilient dome.

6. The illuminated keyswitch of claim 5, wherein the actuating portion defines a center axial line which passes through the actuating pillar and is parallel to the first reflective surface, and said illuminated keyswitch further comprises a reflective layer which is overlaid on the second reflective surface and the back face located on a side of the center axial line away from the first reflective surface.

7. The illuminated keyswitch of claim 1, wherein the actuating portion also has a side surface which is adjacent to the front face and the second reflective surface, the light-guiding device further comprises N positioning portions, N is a natural number, the N positioning portions extend outwardly from the side surface, each of the N positioning portions has a respective and formed-through positioning aperture, and the keycap comprises N positioning posts which are formed on the bottom surface, each positioning post corresponds to one of the N positioning apertures and passes through the corresponding positioning aperture.

8. The illuminated keyswitch of claim 1, wherein the resilient dome is formed from a metal sheet, or formed of a polymer material mixed with a plurality of graphic particles or a plurality of metal particles.

9. The illuminated keyswitch of claim 1, wherein the resilient dome is formed of a polymer material, the resilient dome comprises a metal film at least overlaid on the inner surface of the resilient dome.

* * * * *